United States Patent [19]

Meadows et al.

[11] 3,798,614

[45] Mar. 19, 1974

[54] MAINTENANCE FACILITY FOR A MAGNETIC TAPE SUBSYSTEM

[75] Inventors: James Edward Meadows; Larry Ray Horsman; Anthony Louis Carpentier, all of Boulder, Colo.

[73] Assignee: Storage Technology Corporation, Boulder, Colo.

[22] Filed: May 26, 1972

[21] Appl. No.: 257,078

[52] U.S. Cl. .............................................. 340/172.5
[51] Int. Cl. ......................... G06f 11/08, G06f 13/00
[58] Field of Search .................................. 340/172.5

[56] References Cited

UNITED STATES PATENTS

| | | | |
|---|---|---|---|
| 3,659,273 | 4/1972 | Knauft et al. | 340/172.5 |
| 3,696,340 | 10/1972 | Matsushita et al. | 340/172.5 |
| 3,703,707 | 11/1972 | Bovett | 340/172.5 |
| 3,603,936 | 9/1971 | Attwood et al. | 340/172.5 |

*Primary Examiner*—Paul J. Henon
*Assistant Examiner*—Jan E. Rhoads
*Attorney, Agent, or Firm*—Woodcock, Washburn, Kurtz & Mackiewicz

[57] ABSTRACT

A control unit for a magnetic tape subsystem of a data processing system includes a maintenance facility. This maintenance facility permits the exercise of the magnetic tape subsystem for diagnostic and maintenance purposes. The control unit is of the microprogram type, in which a control memory contains micro orders which control the operation of the magnetic tape units. The maintenance facility exercises the tape subsystem in two different manners—with the Input-/Output command language of the CPU or with the micro order language of the control unit. This can be performed while the magnetic tape subsystem is switched offline to the CPU, or time-multiplexed with the operational usage of the magnetic tape subsystem by the CPU.

The control unit includes a random access memory connected in parallel with the control memory. In the diagnostic mode, micro orders are transferred from a magnetic tape unit to the random access memory. Then, sequences of these micro orders are performed in the same way that micro orders stored in the control memory are otherwise executed in order to perform diagnostic testing.

The data path transferring the micro orders from the magnetic tape unit to the random access memory is a simple one which bypasses the normal circuits which might otherwise introduce errors into the diagnostic micro orders. Amplitude sensors, which are otherwise used for error detection and correction, are connected to majority circuits which produce outputs when the amplitude sensors indicate that a majority of the data tracks are written with a "1." In this manner, very reliable micro orders are obtained for performance of the diagnostic testing function.

The maintenance facility provides full micro order control over a Field Engineer Buffer. Data and commands are loaded into and fetched from any buffer position under manual switch control or microprogram control.

6 Claims, 9 Drawing Figures

TAPE SUBSYSTEM OVERVIEW

FIG. 3 DATA WAVEFORMS FOR LOADER

MAINTENANCE FACILITY FOR A MAGNETIC TAPE SUBSYSTEM

BACKGROUND OF THE INVENTION

This invention relates to magnetic tape subsystems for data processing systems, and more particularly to an improved maintenance facility for magnetic tape subsystems. A data processing system commonly includes a central processor unit (CUP) together with one or more peripheral magnetic tape subsystems. In a typical configuration, a magnetic tape subsystem consists of eight magnetic tape units attached to a tape control unit. The tape control unit is attached to the CPU. Various COMMANDS are transmitted from the CPU to the tape control unit, which then operates the selected tape drive in the necessary manner to properly perform the functions specified by these COMMANDS. Binary data is written on the magnetic tape units or read from the units in response to these commands.

Microprogrammed magnetic tape control units have come into widespread use. These control units accept commands from a central processor unit and translate them into sequences of micro orders which actually control the operation of the various magnetic tape units.

It is common to operate these systems in a diagnostic mode. In this mode, specific COMMANDS are given to the control unit and through it to the various tape units, in order to evaluate the performance of these units. The units are expected to respond to these diagnostic commands in a particular way. If they do not, the abnormal operation is an indication of what part of the tape subsystem is not operating properly. In the prior art, diagnostics have been performed by commands received from the central processor. These diagnostic commands select particular sequences of micro orders permanently stored in the read only memory of the control unit. This diagnostic technique has the disadvantage of typing up the central processor unit for the performance of diagnostics on the magnetic tape units. Also, since the micro orders for the diagnostic operation are limited to a few fixed sequences by the necessity of storing them in the read only memory, it is not possible to obtain a variety of sequences of micro orders which will stress the equipment in a more rigorous manner or diagnose the failure to a more specific area of the equipment.

In another form of prior art, micro order sequences called "MICRODIAGNOSTICS" have been provided to perform diagnostic testing functions. These MICRODIAGNOSTICS may be permanently loaded into ROM (read-only memory) or may be loaded into a read-write memory as needed. In some designs, the MICRODIAGNOSTICS were designed to be operable only while the control unit was switched OFFLINE and thus was unavailable for CPU usage. This severely limited the usage of these MICRODIAGNOSTICS, since it meant that a significant resource (the control unit and its attached I/O units) was unavailable for CPU usage.

Other designs permitted the microdiagnostics to be operated in an "INLINE" mode. In this case the control unit and most of the I/O devices (tape or disc drives) remained ONLINE and available to the CPU. Only the I/O devices used with the microdiagnostics were removed from the use of the CPU. The control unit was shared, via time multiplexing, between the CPU use and microdiagnostic use. This proved a far more useful design because it did not require that the entire subsystem be removed from CPU usage.

A deficiency of the inline microdiagnostics of prior designs is that the algorithm used to determine when to start an INLINE operation is fixed, while the situations that the INLINE operations might be used in are highly variable. This meant that INLINE operations on some systems might be locked out by intensive CPU usage, while in other situations the INLINE operations might actually cause the CPU to be locked out.

One of the most important requirements in testing a magnetic tape unit is that very reliable error-free diagnostic micro orders be transferred to the tape unit.

In loading a memory to contain microdiagnostics it is most important to provide a load path that is error free and does not use the logic which is under test. Prior art control units use the main data flow path to load the microdiagnostics.

Another aspect of the prior art is worth noting. This was the provision, in some subsystems, of a facility from which to provide a source of simulated CPU commands for diagnostic purposes. Typically, a plugboard or read/write buffer was supplied. This plugboard, or buffer was manually loaded with commands and data by the operator, usually a FIELD ENGINEER. Various switches were then configured in such a way as to indicate to the control unit that it was to draw the commands and data from the plugboard or buffer rather than the CPU. The command sequences thus performed would exercise the subsystem in the desired manner.

The principal use of this facility was to exercise the subsystem for diagnostic or trouble-shooting purposes. At times, however, it was used to perform useful work for a customer. This includes the initialization of a new reel of tape or perhaps the examination of a suspect reel of tape for errors.

In the prior art, this facility has suffered from the following deficiencies:

1. It is only operable while the control unit is OFFLINE and thus unavailable for CPU usage.
2. The procedure for setting it up and using it is complex and difficult.

These deficiences have especially handicapped the usefullness of this facility for performing useful customer work.

SUMMARY OF THE INVENTION

The maintenance facility of this invention consists of two major sections with appropriate supporting logic. The first section, called the SPAR RAM, is a 128 position by 16 bit wide random access read/write memory. It is connected in parallel with a read only memory (ROM) which contains the normal control unit micro orders. The SPAR RAM is addressed by the read-only memory address register and its output is fed into the read-only memory data register to drive the micro order decode system. MICRODIAGNOSTIC sequences, called KERNELS, are loaded into the SPAR RAM by a LOADER. The KERNELS perform diagnostic tests of the control unit and tape drives.

The second section, called the FE BUFFER, is a monolithic random access read/write memory with 16 positions that are 12 bits wide. It can be stored into and fetched from, either manually by switches or automatically by the microprogram contained in the ROM or the SPAR RAM. It has two major functions:

a. To serve as a manually loaded source of commands and data in place of the CPU, for diagnostic purposes, and b. as a communication medium between SPAR and the Field Engineer. It also serves SPAR as a scratch pad memory and as a micro-program-loaded source of commands and data.

The above described maintenance facility provides the necessary hardware to perform exhaustive testing of the tape subsystem from the control unit FE PANEL. The advantages of such a facility as exemplified by the following two forms of testing which are available with this facility.

The FIELD ENGINEER uses the FE BUFFER command sequences to simulate the execution of a command sequence received from the CPU. To prepare for the test, the FIELD ENGINEER uses the FE BUFFER manual controls to load the tape unit (TU) address, commands, data, and a byte count into the FE BUFFER. He then presses the START PB to begin the test. The OPERATIONAL MICROPROGRAM will fetch the commands from the FE BUFFER, one by one, and execute them against the tape unit indicated by the TU address. When data is to be written, the data will also be obtained from the FE BUFFER. When data is being read, it can be compared against data in the FE BUFFER if desired.

Note that this mode of testing is performed by the OPERATIONAL MICROPROGRAM only, and does not involve any use of the SPAR RAM. It uses the input/output command language of the CPU.

In another diagnostic operation, referred to as SPAR, diagnostic micro orders are transferred from storage on a tape unit to the SPAR RAM and the orders are thereafter performed.

The FIELD ENGINEER uses this diagnostic technique to verify that the logic circuits and mechanical components of the control unit and tape unit are functioning correctly and to isolate any failures that are detected. To prepare for the test, the FIELD ENGINEER uses the FE BUFFER manual controls to load the TU addresses of the tape drive to be tested and the tape drive which contains the SPAR program tape into FE BUFFER positions 0 and 1. He then sets the SPAR ENABLE switch on and presses START. The OPERATIONAL MICROPROGRAM loads KERNELS from the SPAR tape and executes them, one by one. If a KERNEL detects a failure, it causes an error halt with appropriate indications to indicate the failing component. The SPAR run is continuous until a failure is detected or until all KERNELS on the tape have been executed.

Both of the techniques described above can be performed while the control unit is offline to the CPU or inline with CPU operations. In the offline mode, the control unit is not available for CPU operations, and the MAINTENANCE REQUEST (SPAR or an FE BUFFER command sequence) is the only function being performed by the control unit. If running inline, the control unit is available for use by the CPU. During the times that the control unit is not performing an operation for the CPU, it is allowed to perform an inline SPAR operation or FE BUFFER command if the controls are properly set up for that operation. Note that it has not been possible to execute COMMANDS in the INLINE mode in previous art.

A basic object of INLINE maintenance operations is to perform an adequate number of MAINTENANCE REQUESTS, while at the same time minimizing the impact on CPU operations to the tape subsystem. Since the repetition frequency of CPU requests varies with many factors, it is not possible to establish a single algorithm for regulating when to start a MAINTENANCE REQUEST that is optimum for all situations. A variable priority control is provided to overcome this problem. In basic form, a delay occurs after each CPU operation before the control unit is allowed to start a MAINTENANCE REQUEST. During this delay, the CPU can obtain immediate response to its request. This delay is variable under switch control. Previous art has supplied only a fixed algorithm for determining when to perform an INLINE maintenance operation.

The SPAR KERNEL is a microdiagnostic sequence which is coded in the micro order language of the control unit. Over 350 micro orders and micro branches may be combined in any sequence up to 128 words long to perform the desired diagnostic test. Many sequences are stored on tape, then loaded and executed sequentially.

In accordance with another important object and advantage of this invention, very reliable error-free diagnostic micro order sequences are loaded into the controller. This is accomplished by recording each bit of a micro order as a block of bits on several data tracks of the magnetic tape. Amplitude sensors detect the envelope of each of the data tracks. If the track has data written thereon, the amplitude sensor produces a "1" bit. If there is no data on the track, i.e., it is a "dead track" the amplitude sensor produces a "0" output. The outputs of the amplitude sensors are connected to majority circuits which produce a "1" output if a majority of the data tracks are recorded with data and which produce a "0" output if a majority of the tracks are dead tracks. The output of the majority circuits are loaded directly into the random access memory. Diagnostic micro orders so produced have so much inherent redundancy that they are almost completely reliable. Furthermore, the data path which inserts the bits of the micro orders into the random access memory is a simple one so there is very little chance of faulty operation.

Another major feature of the maintenance facility is that it provides full micro order control over the FE BUFFER. Data can be loaded into and fetched from any FE BUFFER position under microprogram control. This permits a SPAR KERNEL to use the FE BUFFER as a scratch pad memory for constants, counts, and data, etc. It can also load the FE BUFFER with commands and data, then cause the OPERATIONAL MICROPROGRAM to execute these commands and return control to the KERNEL.

SPAR also uses the FE BUFFER as a communication medium between itself and the FIELD ENGINEER. In this usage, the FIELD ENGINEER manually loads control information which the SPAR system then fetches and uses to control the SPAR run. SPAR also places information into the FE BUFFER that the FIELD ENGINEER manually displays to determine the results of the SPAR run. The FE BUFFER provides exceptional utility for this area of logic relative to the amount of circuitry and cost.

The foregoing and other objects, features and advantages of the invention will be better understood from the following more detailed description in conjunction with the claims.

DESCRIPTION OF A PARTICULAR EMBODIMENT

The explanations in this section describe the logic circuitry and controls of the maintenance facility. They include the SPAR RAM, LOADER, and FE BUFFER, plus a number of miscellaneous control functions in addition to a general description of the control unit itself.

BACKGROUND — A MICRO PROGRAMMED CONTROL UNIT

Figure 1:
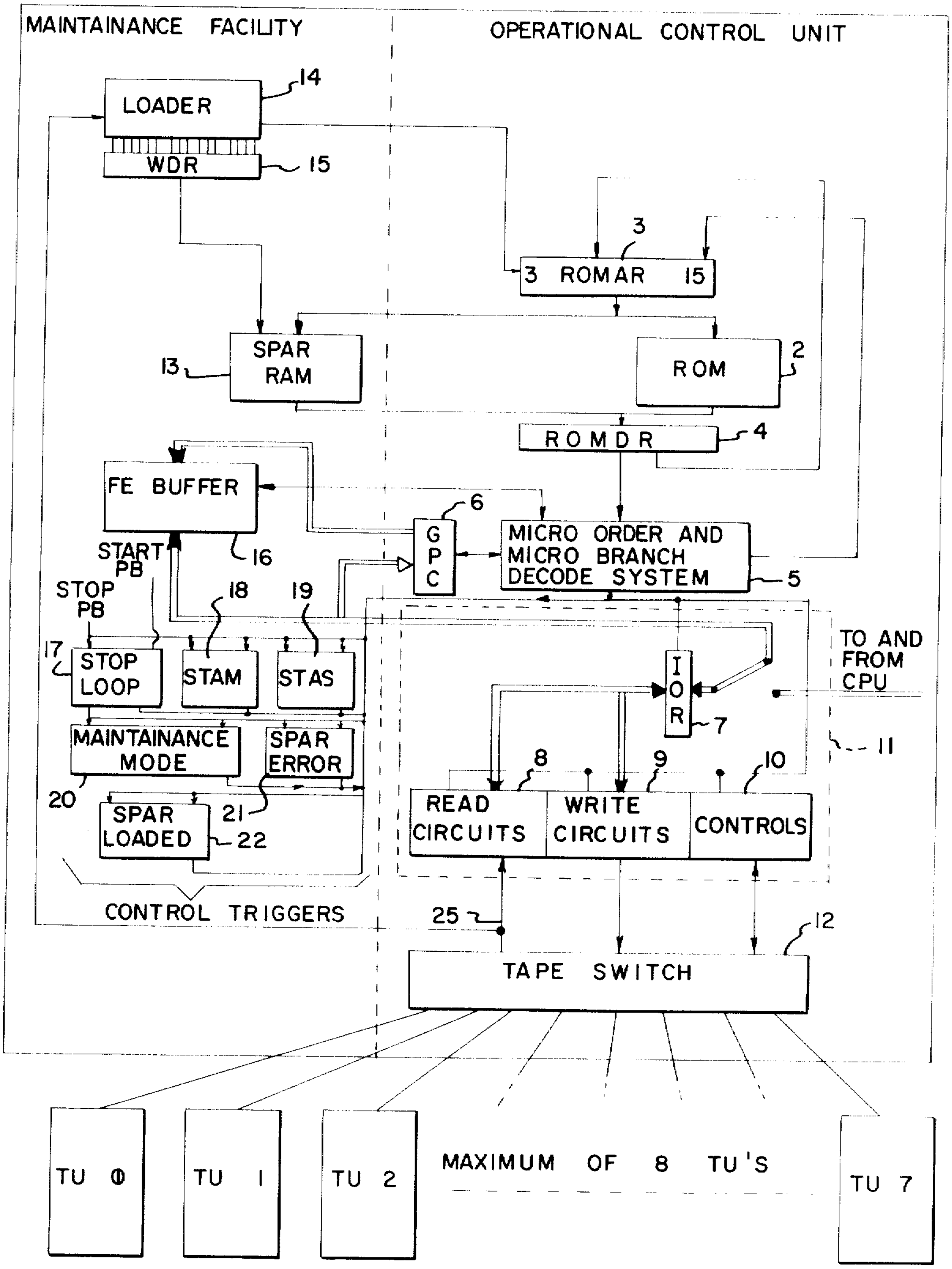
FIG. 1 is a block diagram of the tape subsystem.

FIG. 1 shows a magnetic tape control unit together with magnetic tape units. Typical magnetic tape units and control units include the commercially available Storage Technology Corporation ST 3400/3800 Magnetic tape subsystems.

The control unit is of the micro programmed type. Before proceeding with a description of the present invention, the general operation of a micro programmed magnetic tape control unit will be described.

The control unit includes a control memory 2 which is usually a read only memory. This is addressed by the address register 3 (ROMAR). Data and commands are supplied to the memory data register 4 (ROMDR). A micro order and micro branch decode system 5 decodes these micro orders. They control a general purpose counter 6 (GPC), IOR 7 read circuits 8, write circuits 9, and controls 10.

The logic circuits 11 include an Input/Output register 7, read circuits 8, write circuits 9 and controls 10. A tape switch 12 selectively connects the control unit with different ones of the magnetic tape units.

The micro order and micro branch decode system 5 sets and resets a number of control triggers which are used in the maintenance operation. These triggers are also tested by micro branches in the decode system.

Several hundred micro orders are stored in the read only memory 2. These micro orders are comparable to machine instructions. They are used to control the operation of the tape unit and to move data to and from the tape units. A series of micro orders are selected from the read only memory in response to a command from the central processor unit.

For example, a command from the central processor unit to read a block of data from a magnetic tape unit will select the following, and other, micro commands from read only memory 2. There is a READ signal which is applied to the tape unit. Then a GO signal will set the GO trigger in the tape unit to instruct the tape unit to start moving tape past the read head. A short time later the magnetic tape unit sends a signal back to the control unit indicating that the tape drive is up to speed. In response to this signal, the logic unit 11 signals the micro order and micro branch decode system to update the address register 3 to select the next instruction in the string of micro orders which will read data. In response to the timed completion of one micro order, the address in address register 3 is changed to the address of the next micro order to be executed. The execution of orders in this manner presents the opportunity for conditioned branching based upon a presence or absence of a tested condition in the logic. For example, the following micro orders may be stored in storage locations 3, 4, and 5 of the ROM 2:

| Storage Location | Micro Order | |
|---|---|---|
| 3 | INT PEND | (Interrupt pending) |
| 4 | TU SEL | (tape unit select) |
| 5 | CU SEL | (control unit select) |

After execution of the instruction at 3, the next instruction executed will either be 4 or 5 depending upon whether a branch condition is present. If the logic circuitry 11 determines that a branch is required, the last bit of the address register 3 is set to a 1 and the next instruction executed is instruction 5. If this condition is not present the next order executed is at storage location 4. What has been described thus far is a normal micro programmed magnetic tape control unit.

SPAR RAM

The SPAR RAM 13 is a 128 position read/write monolithic memory with each position being 16 bits wide. It operates in parallel with the control ROM 2. It is addressed by bits 9 through 15 of ROMAR 3, and its data output is fed to the ROMDR 4 in place of data from the ROM 2 when the SPAR KERNEL is in control.

The SPAR RAM 13 is located with data from a tape drive by the LOADER 14, described below. The LOADER 14 places the data in a 16-position register called the WDR 15 and this data is then written into the positions in the SPAR RAM 13 which are designated by ROMAR 3 bits 9 through 15.

The SPAR RAM 13 data output is fed to the ROMDR 4 if ROMAR 3 bits 5 through 8 are on, MAINTENANCE MODE is on, and the SPAR ENABLE switch is on. This means that the SPAR RAM 13 output is used for addresses 780 through 7FF if MAINTENANCE MODE and SPAR ENABLE are on. The addresses below 780 will use the ROM 2 output.

LOADER

Figure 2:
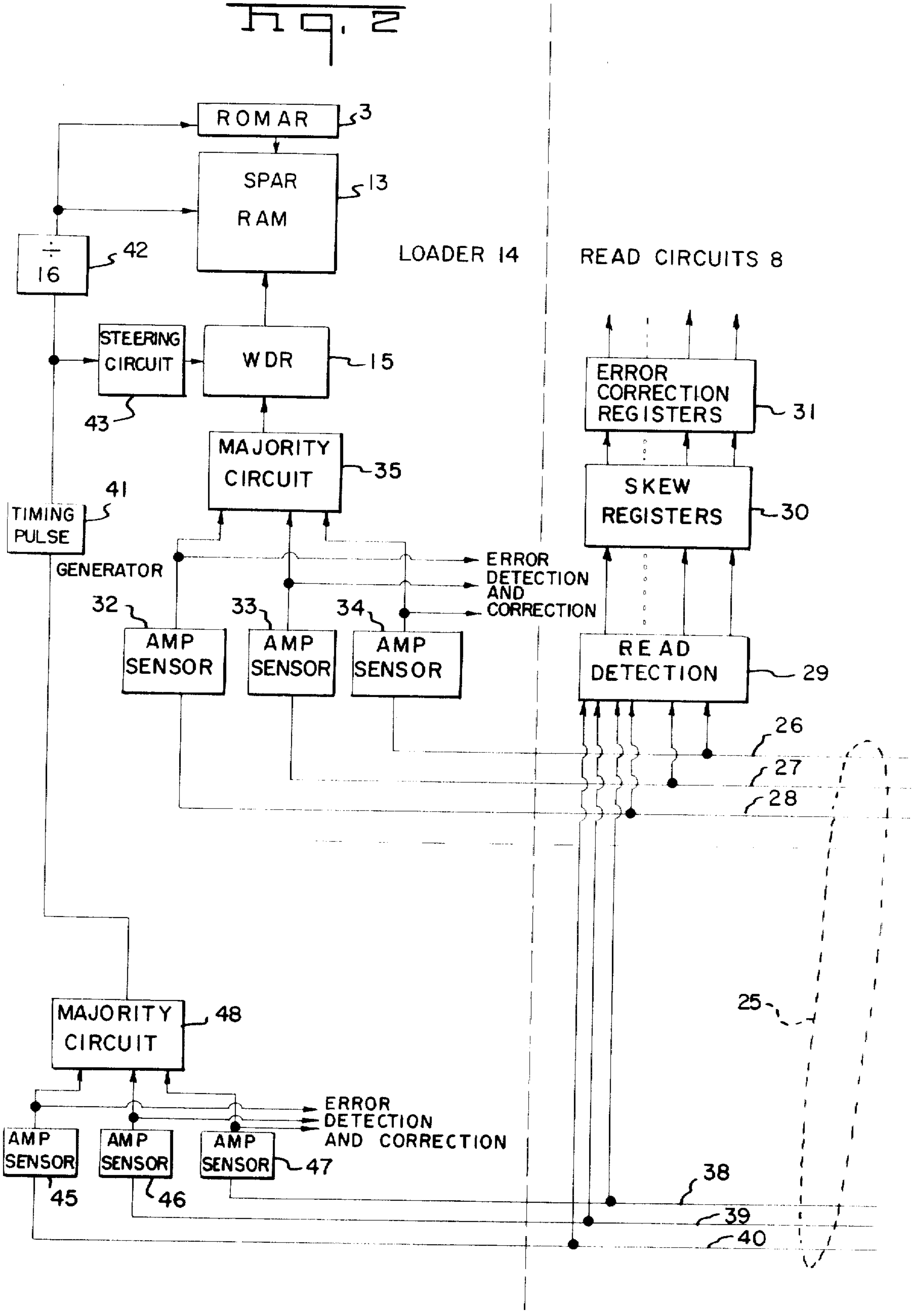
FIG. 2 shows the loader.

Now consider the LOADER 14 in more detail and in particular the load path for micro orders as shown in FIG. 2. The read bus 25 has a plurality of parallel lines whose normal function is to carry data from the tape drive to the control unit. The SPAR data track lines 26, 27 and 28 are shown. In addition, the read bus carries three SPAR timing track lines 38, 39 and 40.

Normally, data from the tape unit enters the control unit through the read detection circuit 29. The data is set into skew registers 30 and error correction registers 31.

In accordance with an important aspect of this invention, this relatively complicated normal data path is bypassed when diagnostic micro orders are transferred from the magnetic tape unit to the controller.

Amplitude sensors 32, 33, 34, 45, 46 and 47 are connected to the read bus. These amplitude sensors detect the envelope of the data being read. When the read heads of a magnetic tape are producing a data output on the read bus the associated amplitude sensor produces an output. When the associated data track is dead, the amplitude sensor produces no output. Normally, the amplitude sensors 32, 33, 34, 45, 46, 47 are used for error detection and correction. That is, they detect dead tracks and the outputs are used to signal an error. In accordance with an important aspect of this invention, the amplitude sensors are used to detect the "1"s and "0"s of the diagnostic micro orders which are written with live and dead track encoding on the magnetic tape.

The outputs of amplitude sensors 32, 33, 34 are applied to the majority circuit 35. Similarly outputs of amplitude sensors 45, 46, 47 are applied to the majority circuit 48. The majority circuits produce a "1" output if two or three of the amplitude sensors are producing a "1" output, that is they are sensing a track on which data has been written. Similarly, the majority circuits produce a "0" output if two or three of the amplitude sensors are sensing a dead track.

Figures 3A, 3B, 3C, 3D, 3E, 3F, 3G, 3H, 3I, 3J:
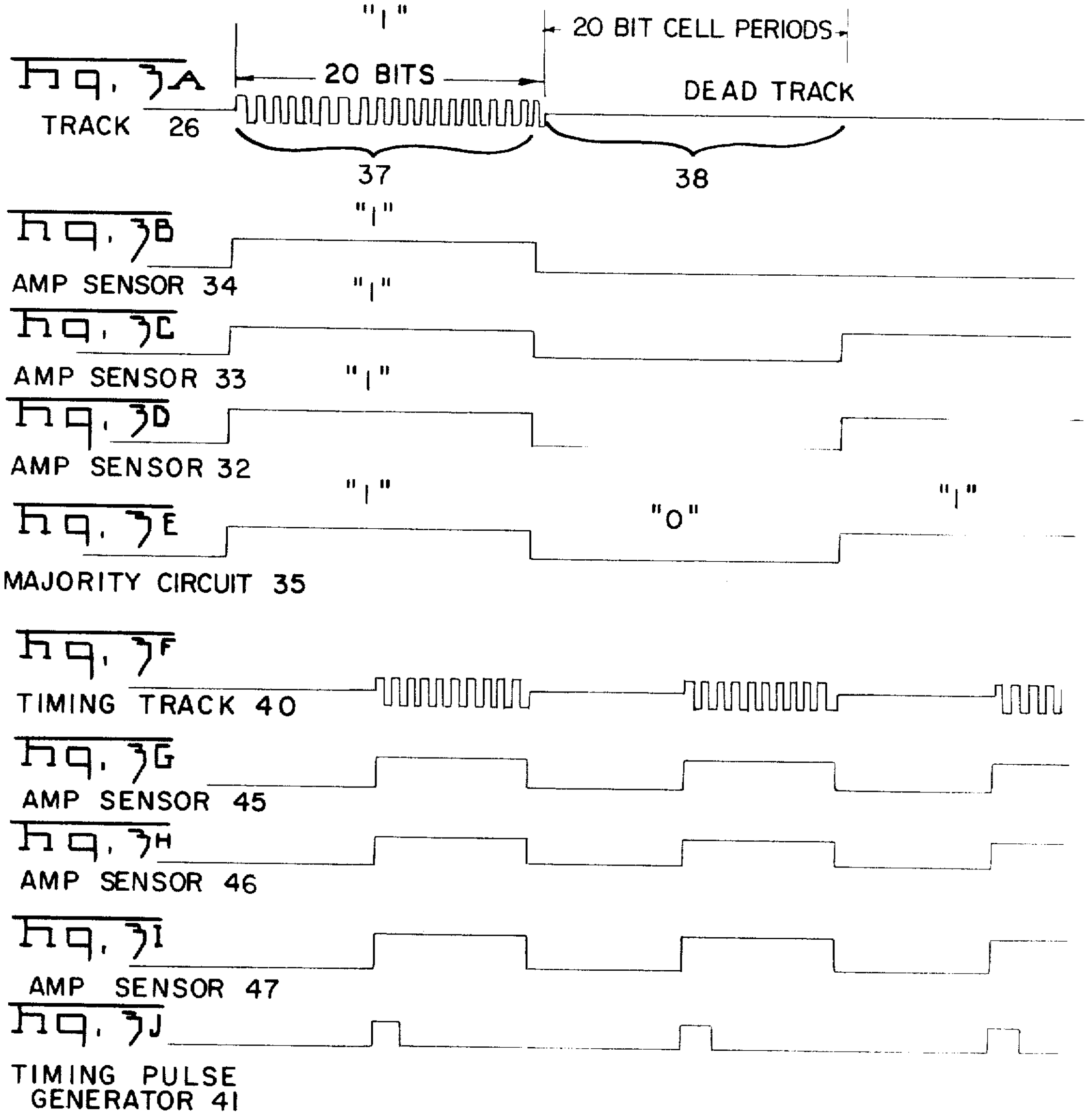
FIG. 3 shows data waveforms for the loader.

The "1"s and "0"s sensed by the majority circuit 35 are set into the WDR (write data register) 15 according to a steering circuit 43 which is stepped by the timing pulse generator 41. When the WDR 15 has been loaded with 16 bits it is written into the SPAR RAM 13 address specified by bits 9 through 15 of ROMAR 49. The encoding and the method of reproducing the diagnostic micro orders can be better understood from the waveforms of FIGS. 3A–3J. FIG. 3A shows a typical line on the read bus reproducing a data track on which diagnostic micro orders have been recorded. The 20-bit cell 37 records a "1" bit in a diagnostic micro order. A dead track has been recorded and reproduced as indicated at 38 to signify a "0" in a diagnostic micro order.

FIG. 3B shows the output of amplitude sensor 34 which is detecting only the envelope of the data track signal. All three data tracks are recorded in the same manner. Therefore, the outputs of amplitude sensors 32 and 33 are reproducing a "1" output at the same time that amplitude sensor 34 produces a "1" output. The output of the majority circuit 35 during this interval is a "1." During the next time interval amplitude sensors 32, 33, 34 are all sensing a "dead track signal." Therefore the majority circuit 35 produces a "0" output during this time interval.

During the next time interval amplitude sensor 34 is sensing a dead track whereas amplitude sensors 32 and 33 are sensing live data. This situation could occur even though all three data tracks have been recorded with the same information. In this case the majority circuit 35 still produces a "1" output. This introduces a great deal of reliability in the micro orders produced in this manner.

FIG. 3F shows the recorded timing track signal which appears on lines 38, 39 and 40. The outputs of amplitude sensors 45, 46, 47. (FIGS. 3G, 3H, 3I) are applied to a majority circuit 48. The output of the circuit 48 is applied to the timing pulse generator 41, which senses the envelope of the timing pulses. It produces a pulse, FIG. 3J, which transfers a "1" or a "0" from the majority circuit 35 into the write data register 15, then steps the steering circuits 43 to cause the next bit to be loaded into the next bit position in the WDR. Sixteen of the bits make up one word of a micro order. The output of timing pulse generator 41 is divided by 16 as indicated at 42. For every 16 timing pulses so produced, a word is transferred from the write data register 15 into the SPAR RAM 13 in accordance with ROMAR 3 bits 9 through 15. ROMAR then steps to the next sequential address.

FE BUFFER

Figure 4:
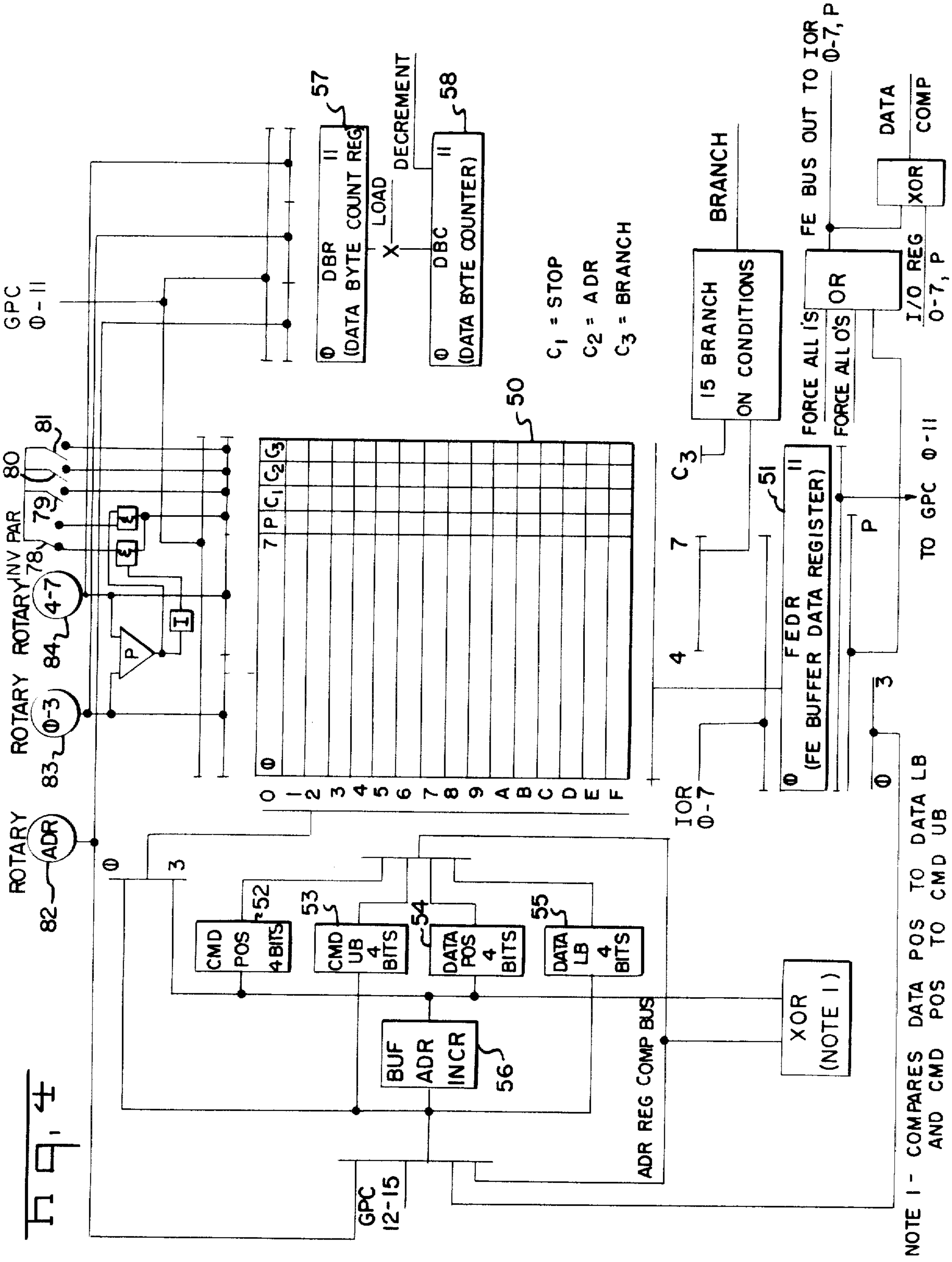
FIG. 4 shows the FE BUFFER.

Now refer to FIG. 4 for a diagram of the FE BUFFER 16. The FE BUFFER is a monolithic read/write memory containing 16 positions that are each 12 bits wide. It can be stored into or fetched from by manual switches or microprogram controls, which permit it to be used in strictly manual operations, mixed manual and automatic operations, and completely automatic (Microprogrammed) operations.

Under manual operation, the FE panel switches provide the data and the address to be stored into and displayed from. In microprogram-controlled operations, bits 0 through 11 of the GPC 6 supply data to be stored into the FE BUFFER, while the address to be used is supplied from a variety of sources, depending on the function to be performed. The data from the buffer can be sent into the main data flow of the control unit via the I/O Register 7, or can be sent to GPC 6 bits 0 through 11.

The FE BUFFER has three major functions. The first is to serve as a source of commands and data while exercising the control unit and tape drive from the FE PANEL for diagnostic or debug purposes. In this case, the FIELD ENGINEER will use the FE BUFFER manual controls to load the desired command codes, data, and control information into the FE BUFFER, then depress the START PB. The OPERATIONAL MICROPROGRAM will remove this data and use it to select and operate the control unit and tape drive in the desired manner. The SPAR KERNEL can also load commands and data into the FE BUFFER for use by the OPERATIONAL MICROPROGRAM. The second function of the FE BUFFER is to serve as a communications medium between the FIELD ENGINEER and SPAR. The FIELD ENGINEER will load control information into the FE BUFFER for interrogation by the SPAR EXECUTIVE ROUTINE, and will display and analyze the information that has been loaded into the FE BUFFER by the SPAR EXECUTIVE ROUTINE and the SPAR KERNELS.

The third function of the FE BUFFER is to serve as a scratch-pad memory for the SPAR KERNELS. In this case, the SPAR KERNELS can store data into desired FE BUFFER positions and later fetch the data back. This data is used for such purposes as counts, constants, ID codes, and many other functions.

THE FE BUFFER AND LOGIC CIRCUITS (FIGS. 3 AND 4)

A description of the logic of the FE BUFFER follows. An FE BUFFER ARRAY 50 is a 16-position by 12 bit wide monolithic read/write memory. Bits are numbered 0 through 7, P, C1, C2, and C3.

FEDR 51—a 12-bit register, FEDR 51, receives data from the FE BUFFER array 50. Bits 0 through 7 can also be loaded from the I/O register in the main data flow under micro order control.

CMD POS 52—A 4-bit register 52, called the Command Position Register, is used as a pointer to the FE BUFFER position which contains the next command to be executed.

CMD UB 53—A 4-bit register 53, called the Command Upper Bounds Register, is loaded to the address of the highest FE BUFFER position to be used as a command.

DATA POS 54—A 4-bit register called the Data Position Register, is used as a pointer to the FE BUFFER position that contains the next data byte to be fetched when fetching data from the buffer.

DATA LB 55—A 4-bit register called the Data Lower Bounds Register, is loaded to the address of the lowest position in the FE BUFFER from which data will be fetched.

BUF ADR INCR 56—An incrementer-decrementer 56 is used to update the contents of the CMD POS and DATA POS registers.

DBR 57—A 12-bit register called the Data Byte Count Register, is used to retain the value to be loaded into the DBC. It can be manually loaded from the FE BUFFER rotary switches or automatically loaded from the GPC.

DBC 58—A 12-bit counter called the Data Byte Counter, is used to count the number of bytes to be written during a write command from the FE BUFFER, and is used as a utility counter during SPAR operations.

FE BUFFER MANUAL CONTROLS

Figure 5:
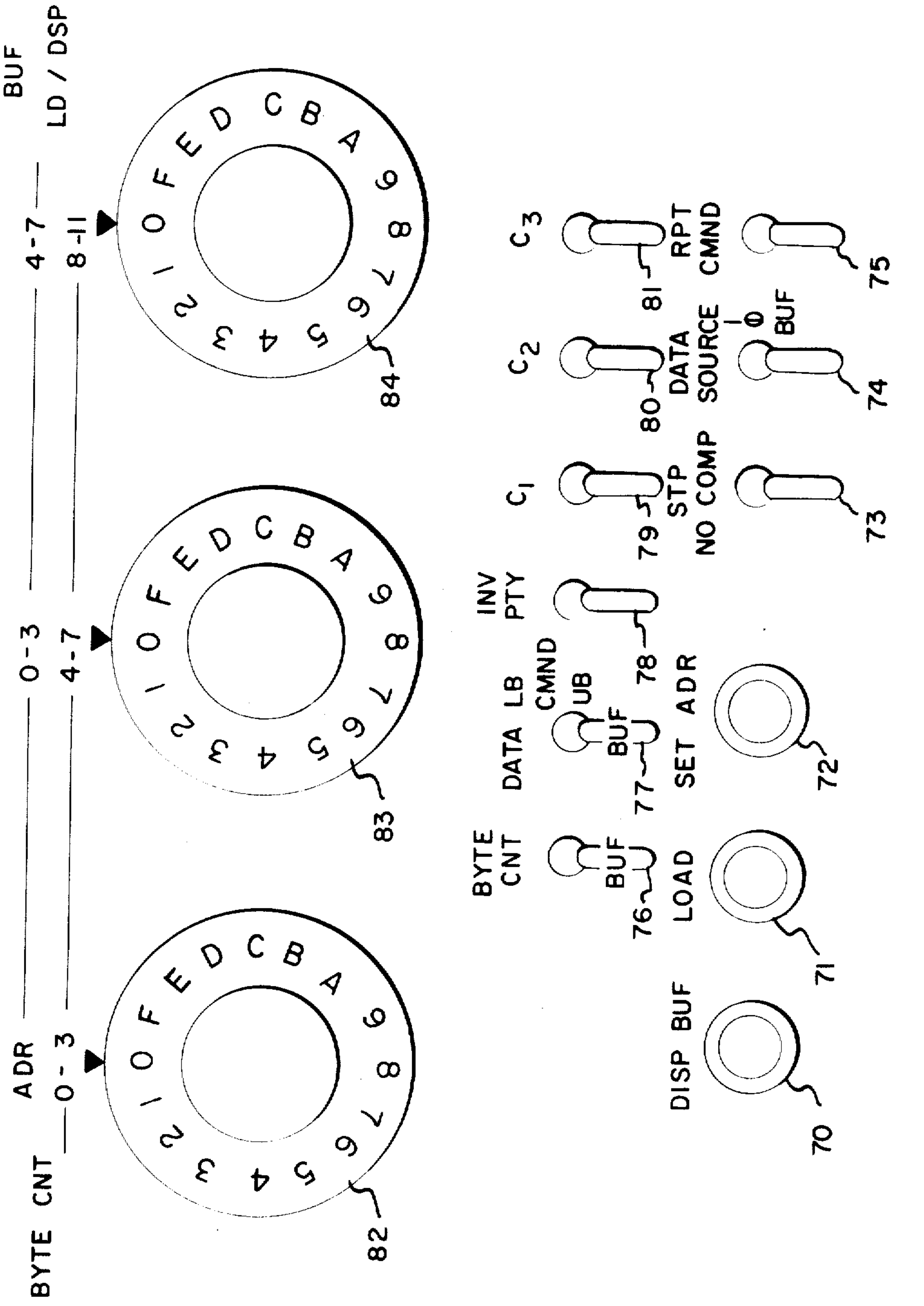
FIG. 5 shows the FE BUFFER manual controls.

The manual controls of the FE BUFFER are described below. The electrical connections of these manual controls to the logic circuits will be apparent from a description of the functions performed. The manual controls themselves are shown in FIG. 5 which is a drawing of a portion of the FE PANEL.

PUSHBUTTONS

DISP BUF 70—actuation of pushbutton switch 70, causes the contents of a buffer register to be displayed. The left rotary switch 82 is set to the register that is to be displayed. The DISPLAY SELECT A and B SWITCHES (not shown) are placed in the FE BUF positions. SELECTABLE DISPLAY A lights will display bits 0 – 7 of the register. SELECTABLE DISPLAY B is broken down as follows: Bit 0 is the parity bit, bits 1–3 are the C1, C2, and C3 bits, and bits 4–7 display the contents of the BUF ADR INCR.

LOAD 71—Actuation of pushbutton switch 71, causes the contents of the two right-hand rotary switches 83, 84 to be loaded into the buffer position designated by the left rotary switch 82. Odd parity is computed on these 8 bits and placed in the "P" position. If the C1 79, C2 82, or C3 81 switches are up, the LOAD pushbutton 71 will load them into the buffer also. If the BYTE COUNT/BUF switch 76 is up, the contents of the three rotary switches 82, 83, 84 will be loaded into the Data Byte Count Register.

SET ADR 72—When this pushbutton switch is depressed the value of the left-hand rotary switch 82 will be loaded into the register specified by the DATA LB/CMND UB/BUF switch 77.

TOGGLE SWITCHES

STP NO COMP 73—Causes the Control Unit to stop if the data in the I/O register does not compare with the data selected by the DATA SOURCE switch 74. This switch is effective for Read and Read Backward functions only.

DATA SOURCE 74—There are three sources of data for writing or read comparing. If the switch is in the lower (BUF) position, data will be taken from the buffer. The middle position causes all 0's to be used. The top position causes all 1's to be used. RPT CMND 75—The command currently being executed will be repeated until the STOP button is depressed or the RPT CMND is turned off.

BYTE CNT/BUF 76—When this switch is up, the contents of the buffer rotary switches 82, 83, 84 will be loaded into the Data Byte Count Register when the LOAD button is depressed. If the rotary switches are at 000, a continuous record will be written. When this switch is down, in the BUF position, the contents of the rotary switches will be loaded into the FE BUFFER when the LOAD button is depressed.

DATA LB/CMND UB/BUF 77—Used to indicate which of these registers will be loaded when the SET ADR 72 pushbutton is depressed. The data to be loaded into the specified register is taken from the leftmost of the three FE BUFFER rotary switches 82.

INV PTY 78—A spring loaded toggle switch, if on, will cause even parity to be computed on the data in the rightmost two FE BUFFER rotary switches 83 and 84 and loaded into the P bit of the specified FE BUFFER position when the LOAD pushbutton 71 is depressed. If it is off, odd parity will be computed on the data in the rightmost two FE BUFFER rotary switches and loaded into the specified FE BUFFER position.

C1 79, C2 80, C3 81—Control bits which are loaded into the selected FE BUFFER position when the LOAD pushbutton 71 is depressed. The function of these bits will be explained in the paragraphs on automatic controls of the FE BUFFER.

ROTARY SWITCHES 82, 83, 84—Three rotary switches are provided for the FE BUFFER. The leftmost of these switches 82 is the ADR rotary switch, and will specify which FE BUFFER position, from 0 to 15 (0 to F in hexadecimal) is to be loaded or displayed when the appropriate pushbutton is depressed. It will also supply data to be placed in the specified four bit register when the SET ADR pushbutton 72 is depressed.

The rightmost two rotary switches 83 and 84 supply 8 bits of data to be loaded into bits 0 – 7 of the FE BUFFER position specified by the ADR rotary switch 82 when the LOAD pushbutton 71 is depressed.

All three rotary switches together supply 12 bits of data to be placed into the DBR 57 if the BYTE CNT/BUF switch 76 is in the BYTE COUNT position and the LOAD pushbutton 71 is depressed.

FE BUFFER AUTOMATIC CONTROLS

The automatic controls of the FE BUFFER are described below. Refer to FIG. 4 for a data flow diagram of the FE BUFFER.

1. ACCESS CMND is a micro order which is used to fetch a command from the FE BUFFER and place it in the FEDR 51. The contents of the CMD POS register 52 are used to select which FE BUFFER position is to be fetched. After the fetch is completed, the contents of the CMD POS register 52 are incremented by one and placed back in the CMD POS register 52, unless the CMD POS 52 and CMD UB 53 contents were identical. In such a case, the CMD POS register 52 is reset to contain a value of zero.

As the data is loaded into FEDR 51, it is examined for any bit on in the C1, C2, or C3 positions. If C1 is on, the OPERATIONAL MICROPROGRAM will set the STOP LOOP TRIGGER. If C2 is on, the FEDR contents are treated as a tape drive address rather than a command and the OPERATIONAL MICROPROGRAM will transfer bits 0 to 7 to the tape until address register in the CONTROLS 10 section of the control unit, where it is used to select a particular tape drive. If C3 is on, bits 4 to 7 are used to select a particular branch condition to be tested. If the tested condition is present, bits 0 to 3 are transferred from FEDR 51 into the CMD POS register 52, and another ACCESS CMD micro order is issued by the OPERATIONAL MICROPROGRAM. Although 15 branches are available, the only branches which are currently defined are UE (Unit Exception, used to tell when end of tape marker is sensed on a write type command or a tape mark on read command), TI (Tape Indicate, which indicates reaching the end of tape marker on a read command), UC (Unit Check, used to tell when a check condition has been detected), and an unconditional branch.

After the OPERATIONAL MICROPROGRAM has determined that the FEDR 51 contents are not a tape unit address (bit C2 on) and not an FE BUFFER branch, (bit C3 on) it will transfer the FEDR contents to the command register, which is located in the CONTROLS 10 section of the control unit.

2. DATA FETCH is a hardware logic function (caused by logic circuitry rather than by a micro order) which is used to obtain a byte of data from the FE BUFFER.

If the control unit is performing a write command, a DATA FETCH will occur when the main data path can accept a byte of data. This will cause the contents of the DATA POS register 54 to be used to select a position of the FE BUFFER. The contents of this position of the FE BUFFER are placed in FEDR 51, then transferred into the main data path of the control unit and ultimately written on tape by a tape drive.

After the DATA POS register 54 contents are used to select an FE BUFFER position from which to fetch a byte of data, it is passed thru the BUF ADR INCR 56 and incremented by one, then placed back in the DATA POS register 54. If the DATA POS contents are '1111' binary, however, the contents of the DATA LB register 55 are placed in the DATA POS register 54. In this way, the data will be fetched from the FE BUFFER positions between the DATA LB 55 and FE BUFFER position 15, inclusive.

If the control unit is performing a forward read and the STP NO COMP switch is on, the same sequence will occur, except that instead of transferring the data into the main data path, a comparison is made between the contents of FEDR 51 and IOR 7 (As shown in FIG. 1, IOR is the register that interfaces with the channel or the FE BUFFER). The data read from the tape by the tape drive is passed back to the IOR 7 for transfer to the channel if running with the CPU or for comparison with FEDR 51 if the control unit is performing a command out of the FE BUFFER.

If a mismatch between FEDR 51 and IOR 7 is detected, the data in these registers will be "frozen" for examination by the FIELD ENGINEER. He can then determine the bit that failed by visually comparing the contents of these two registers.

If control unit is performing a backward read, the sequence differs in that the contents of the DATA POS register 54 are decremented rather than incremented. When the contents of the DATA POS register 54 matches the contents of the DATA LB register 55, the DATA POS register 54 is loaded with a value of '1111' binary. This permits a comparison of data on a read backward operation, after it was written on tape in a forward direction.

3. DATA BYTE COUNTING is performed only on a write operation. As the OPERATIONAL MICROPROGRAM prepares to start the DATA FETCHING while beginning a write operation, it transfers the DBR 57 contents into the DBC 58 (the DBR being previously loaded). As each DATA FETCH occures, the DBC 58 is decremented by one. When it decrements to zero, it blocks further DATA FETCHING, which in turn signals the completion of the write operation.

4. Various MICRO ORDERS permit the FE BUFFER to be manipulated under micropgoram control. They include the following:

a. SET BUR ADR—Loads the CMD POS register 52 to the value contained in GPC 6 bits 12–15.

b. SET CMD UB—Loads the CMD UB register 53 to the value contained in GPC 6 bits 12–15.

c. SET DATA LB—Loads the DATA LB register 55 to the value contained in GPC 6 bits 12–15.

d. WRT BUFFER—The FE BUfFER position specified by GPC bits 12—15 is loaded with the value contained in GPC 6 bits 0–11.

e. GPC TO DBR—The DBR 57 is loaded to the value contained in GPC 6 bits 0–11.

f. ACCESS CMND—The micro order which initiates the ACCESS CMND action described in (1) above.

g. FETCH BUF—The FE BUFFER position specified by GPC bits 12–15 is fetched into the FEDR 51.

h. FEDR TO GPC—Transfers FEDR 51 contents to GPC bits 0–11.

i. DBR TO DBC—Transfer the DBR 57 contents to the DBC 58.

j. DEC DBC—Decrement the DBC 58 value by one.

k. IOR TO FEDR—Transfer the contents of the IOR into FEDR 51 bits 0–7.

l. SW TO FEBUF—Loads the 8-bit binary value that corresponds to the setting of the rightmost two FE BUFFER rotary switches into the FE BUFFER position specified by GPC bits 12–15.

5. Various MICRO BRANCHES permit the examination for certain logic conditions in the FE BUFFER under micro-program control. They include the following:

a. BUF BRANCH—A FE BUFFER branch (bit C3 on) has been detected in FEDR 51 and the branch is successful. The target ADR is automatically fetched by the hardware after performing an ACCESS CMND micro order.

b. BUF HAS ADR—A tape unit address (bit C2 on) has been detected in FEDR 51 after performing an ACCESS CMND micro order.

c. BUF STP CMND—A request to stop at completion of the current command has been detected in FEDR 51 (bit C1 on) after performing an ACCESS CMND micro order.

d. BUF BR P—Test for the presence of the P bit in FEDR 51 after performing a FETCH BUF micro order.
e. BUF BR C1—Test for the presence of the C1 bit in FEDR 51 after performing a FETCH BUF micro order.
f. BUF BR C2—Test for the presence of the C2 bit in FEDR 51 after performing a FETCH BUF micro order.
g. BUF BR C3—Test for the presence of the C3 bit in FEDR 51 after performing a FETCH BUF micro order.
h. BUF EU IOR—Compare FEDR 51 bits 0–7 and parity against IOR 7 bits 0–7 and parity.
i. BUF E IOR 0–7—Compare FEDR 51 bits 0–7 against IOR 7 bits 0–7.
j. DBC = 0—Test the DBC 58 for contents of 000.
k. SPAR XFER—Test for a SPAR XFER code in FEDR 51 (Bits 0–7 equal to FF hex). The SPAR XFER code permits a SPAR KERNEL to retrieve microprogram control after causing the OPERATIONAL MICROPROGRAM to perform commands that the SPAR KERNEL had loaded into the FE BUFFER.

PRIORITY CONTROL

Figure 6:
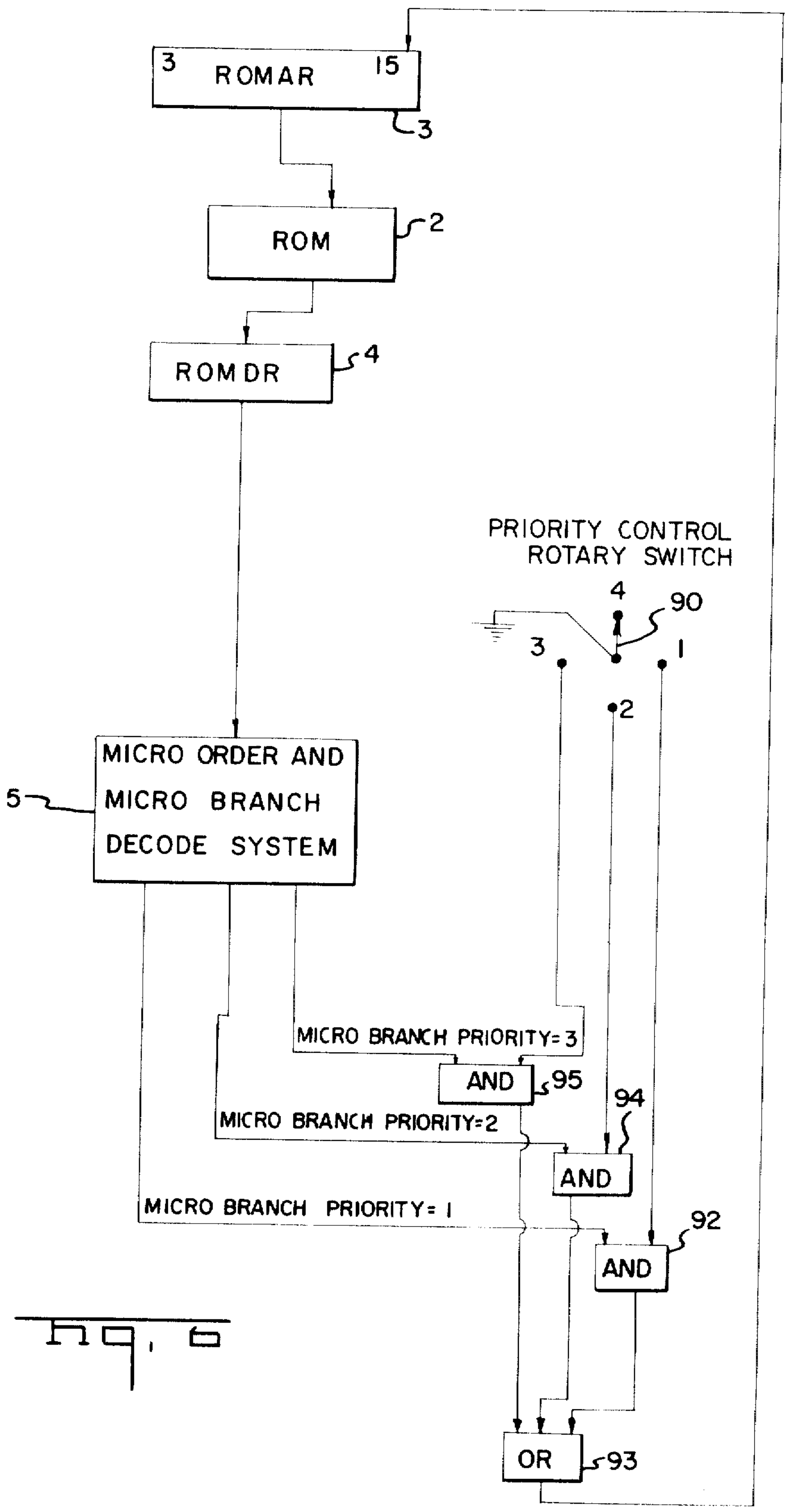
FIG. 6 shows the priority control logic.

Referring to FIG. 6, a four-position rotary switch 90 allows the FIELD ENGINEER or operator to select the break in priority for a maintenance request. Four priority levels are allowed, and are designated 1 thru 4. Highest priority for a MAINTENANCE REQUEST is 1, and lowest priority is 4.

The PRIORITY CONTROL provides a means of manually controlling the amount of impact that the MAINTENANCE REQUESTS have on CPU usage of the control unit. In some situations, it may be desired to obtain a maximum number of MAINTENANCE REQUESTS in order to accomplish a rapid diagnosis and repair of a faulty unit, while in other situations, the principal criteria may be to perform the diagnosis and repair with a minimum impact on CPU usage.

The OPERATIONAL MICROPROGRAM will examine the PRIORITY CONTROL each time it completes a CPU operation and will set up a delay count which is graduated according to the setting of the PRIORITY CONTROL. This delay count is automatically decremented while the OPERATIONAL MICROPROGRAM IS cycling in the IDLE LOOP. The OPERATIONAL MICROPROGRAM is not allowed to leave the IDLE LOOP on a MAINTENANCE REQUEST until this delay is complete, but can still honor any CPU requests as they are received.

As an example of this, each time the micro order and micro branch decode system detects the completion of a CPU operation, it uses micro brances to sense the setting of the PRIORITY CONTROL rotary switch 90. The priority delay count will be set to a low value if the PRIORITY CONTROL rotary switch 90 is set to position 1, and progressively higher values if the switch is set to positions 2, 3, or 4. The higher the delay value, the longer that a MAINTENANCE REQUEST will be delayed.

In the case where it is desired to minimize interference with CPU operations, the PRIORITY CONTROL rotary switch 90 is set to position 4, thus creating a large "time window" in which the CPU can return with another command without interference from MAINTENANCE REQUESTS. If trying to maximize the number of MAINTENANCE REQUESTS, setting the PRIORITY CONTROL rotary switch 90 for maximum maintenance priority causes the priority delay, and therefore the "time window" to be minimized. The total effect is to allow the FIELD ENGINEER to customize his INLINE maintenance run to the needs of the situation.

MISCELLANEOUS MAINTENANCE FACILITY CONTROLS

The MAE has a number of mixcellaneous control functions which cannot be classified into any of the above described categories.

CONTROL TRIGGERS AND LOGIC FUNCTIONS

STOP LOOP—A trigger 17 (FIG. 1), if off, indicates that a MAINTENANCE REQUEST is active. It is set by the STOP pushbutton or by a micro order, and is reset by the START pushbutton. It is tested by a micro branch.

STAM—A control trigger 18 is set and reset by micro orders and tested by a micro branch. It is used for control purposes by the OPERATIONAL MICROPROGRAM and by the SPAR KERNELS.

STAS—A control trigger 19 is set and reset by micro orders and tested by a micro branch. It is used for control purposes by the OPERATIONAL MICROPROGRAM and by the SPAR KERNELS.

MAINTENANCE MODE—A control trigger 20 is set and reset by micro orders and tested by a micro branch. If on, it indicates that the control unit is executing a MAINTENANCE REQUEST.

SPAR ERROR—A trigger 21 is set and reset by micro orders and tested by a micro branch. It is set by a SPAR KERNEL to indicate that a failure has been detected. Its status is indicated on the FE PANEL.

SPAR LOADED—A control trigger 22 is set and reset by micro orders, and tested by a micro branch. It is normally set at the completion of the INITIALIZATION PHASE of a KERNEL to indicate that the KERNEL has been successfully loaded and initialized.

CU CONDITION STORED—A logic function which is used while running SPAR or FE BUFFER commands INLINE to indicate that the control unit is retaining some function or indication for the CPU, and is therefore unavailable for a MAINTENANCE REQUEST. It blocks the exit from the IDLE LOOP on a MAINTENANCE REQUEST even if the STOP LOOP trigger 17 is off. Typical conditions which raise this function are Interrupt Pending (Control unit is retaining an interrupt for the CPU) and various check or error conditions.

MICRO ORDERS

SET STP LOOP—Sets the STOP LOOP trigger 17.
RST STP LOOP—Resets the STOP LOOP trigger 17.

SET MAINT—Sets the MAINTENANCE MODE trigger 20.
RST MAINT—Resets the MAINTENANCE MODE trigger 20.
SET SPAR LDD—Sets the SPAR LOADED trigger 22.

RST SPAR LDD—Resets the SPAR LOADED trigger 22.

SET SPAR ERR—Sets the SPAR ERROR trigger 21.

RST SPAR ERR—Resets the SPAR ERROR trigger 21.

SET STAM—Sets the STAM trigger 18.

RST STAM—Resets the STAM trigger 18

SET STAS—Sets the STAS trigger 19.

RST STAS—Resets the STAS trigger 19,

MACH RST—Resets most of the control triggers latches in the control unit.

START LOAD—Initiates the LOADER 14 which loads the KERNEL into the SPAR RAM.

MICRO BRANCHES

INTF ENABLE—Tests to determine if the control unit is online and available for use by the CPU.

STOP LOOP—Tests the status of the STOP LOOP trigger 17.

CU COND STOR—Tests for the presence of the CU CONDITION STORED logic function.

MAINT MODE—Tests the status of the MAINTENANCE MODE trigger 20.

SPAR LDD—Tests the status of the SPAR LOADED trigger 22.

SPAR ERROR—Tests the status of the SPAR ERROR trigger 21.

STAM—Tests the status of the STAM TRIGGER 18.

STAS—Tests the status of the STAS trigger 19.

SPAR SW—Tests the status of the SPAR ENABLE switch.

WTM SW—Tests the status of the WTM switch.

TU OFFLINE—Tests the status of the OFFLINE SWITCH on the tape drive.

PRIORITY = 1—Tests for priority level 1

PRIORITY = 2—Tests for priority level 2

PRIORITY = 3—Tests for priority level 3.

Note that a priority level of 4 is assumed if priority levels 1 through 3 are all off.

MANUAL CONTROLS

1. SPAR ENABLE—A two position toggle switch. If it is on and the WTM switch is off, a MAINTENANCE REQUEST will be interpreted as a SPAR request and the SPAR EXECUTIVE ROUTINE will be entered.
2. WTM—A two position toggle switch. If it is on, a MAINTENANCE REQUEST will be interpreted as a request to write a tape mark on the specified tape drive unless the SPAR ENABLE switch is also on—in such case, the MAINTENANCE REQUEST will be interpreted as a request to issue a rewind to the specified tape drive.
3. Priority Control Switch 90—This is described in section 4.4.0.
4. START—A pushbutton which is used to reset the STOP LOOP trigger.
5. STOP—A pushbutton which is used to set the STOP LOOP trigger.
6. TU OFFLINE—A two position toggle switch located on a circuit panel on the tape unit. The status of this switch is returned over a status line to the control unit where it can be examined by a micro branch. The purpose of the switch is to permit a tape drive to be assigned to online (CPU) use or offline (MAINTENANCE MODE) use, but not both. If the switch is in the online position, the OPERATIONAL MICROPROGRAM will allow the tape drive to be used for CPU commands but not for FE BUFFER commands or SPAR functions. If the switch is in the offline position, the OPERATIONAL MICROPROGRAM will allow the tape drive to be used for FE BUFFER commands or SPAR FUNCTIONS, either INLINE or OFFLINE, but not for CPU commands. This form of operation protects customer tapes from damage by careless usage of SPAR or FE BUFFER operations, since it requires a match between the address set up for these functions in the control unit and the OFFLINE switch on the tape drive which is to receive the SPAR or FE BUFFER operations.

OPERATION OF THE MAINTENANCE FACILITY

The MAF hardware has been described. This section will explain how this hardware is used to provide the desired testing functions. FE BUFFER COMMAND SEQUENCE—Assume that the FIELD ENGINEER wishes to set up and repetitively execute a command sequence of write—read backward—read, with data of 55-AA hex, and data comparison, to tape drive address.

5. He would manipulate the manual controls 70–84 (FIG. 4) to perform the following actions.

1. Load a value of 05 with C2 on into position 0 of FE BUFFER 50 to set up the desired tape drive address.
2. Load the order codes for the write, read backward, and read commands into positions 1, 2, and 3 respectively of FE BUFFER 50.
3. Load data values of 55 and AA (hex) into FE BUFFER positions 14 and 15 respectively.
4. Set the CMD UB register 53 to 3.
5. Set the CMD POS register 52 to 0.
6. Set the DATA LB register 55 to 14.
7. Set the STP NO COMP switch 79 on.
8. Set the OFFLINE switch on tape drive 5 to the offline position.
9. Press START On the control unit.

The OPERATIONAL MICROPROGRAM will find the STOP LOOP trigger 17 reset while cycling in the IDLE LOOP, and will leave the IDLE LOOP on a MAINTENANCE REQUEST. The MAINTENANCE MODE trigger 20 is set and the WTM and SPAR ENABLE are examined.

Since both are off, the OPERATIONAL MICROPROGRAM will enter the sequence that fetches a command from the FE BUFFER. After fetching the command, the OPERATIONAL MICROPROGRAM will execute the command, then return to the IDLE LOOP. This has completed the execution of one command.

The process described above is repeated for each command. During the execution of each command, data is taken from the FE BUFFER to be written on the tape drive and to be compared with data obtained from the tape drive during the read and read backward operations.

If running the FE BUFFER commands in the INLINE mode, the CPU may attempt to issue a command while the control unit is performing a command from the FE BUFFER. In such a case it will receive a busy indication. The control unit remembers that it was requested by the CPU, however, and when the OPERATIONAL MICROPROGRAM returns to the IDLE LOOP, it will send an indication that it is no longer busy to the CPU, then wait for the command to be reissued.

Figure 7A:
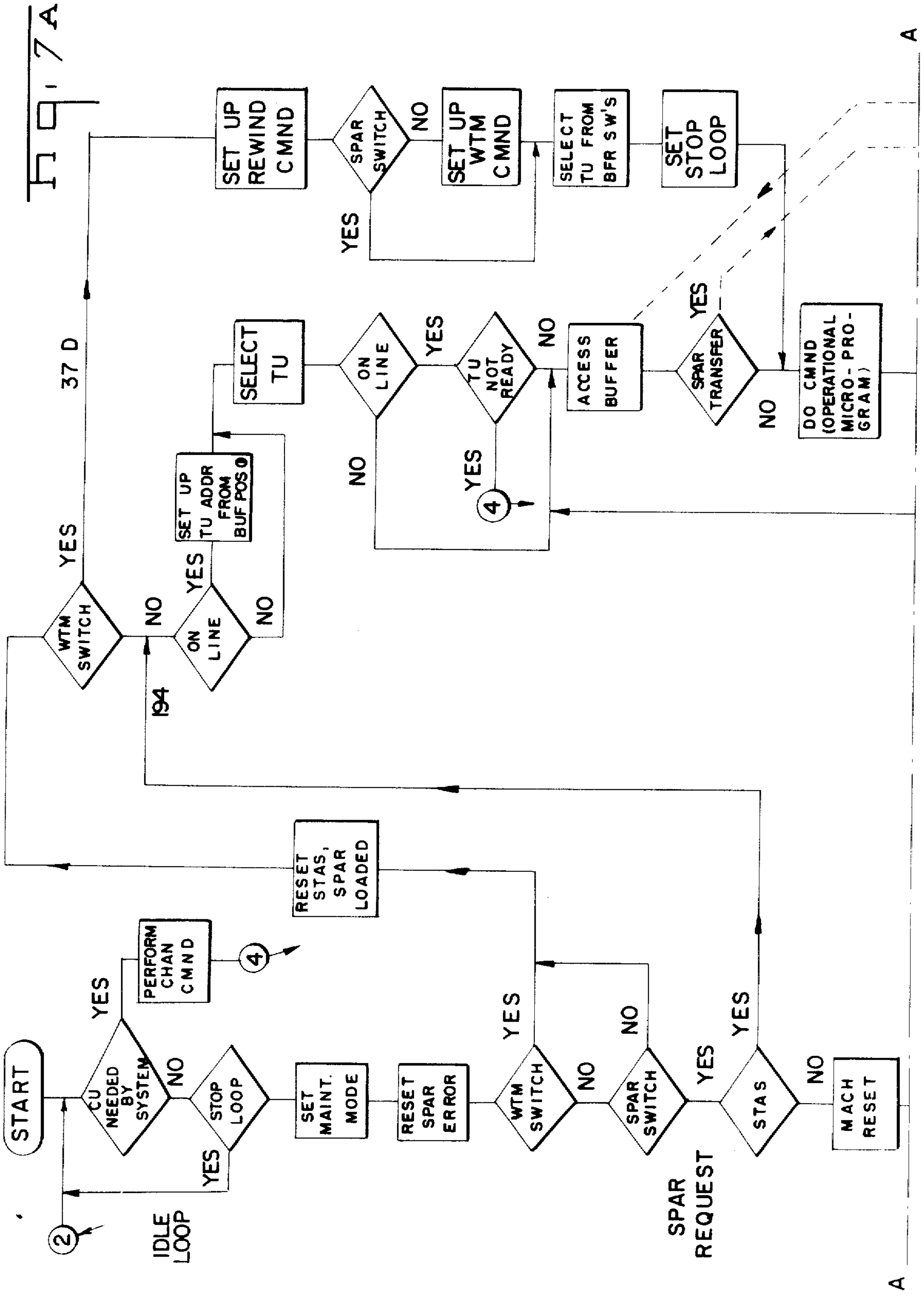
FIGS. 7A–7C are a Microprogram Flowchart
Figure 7B:
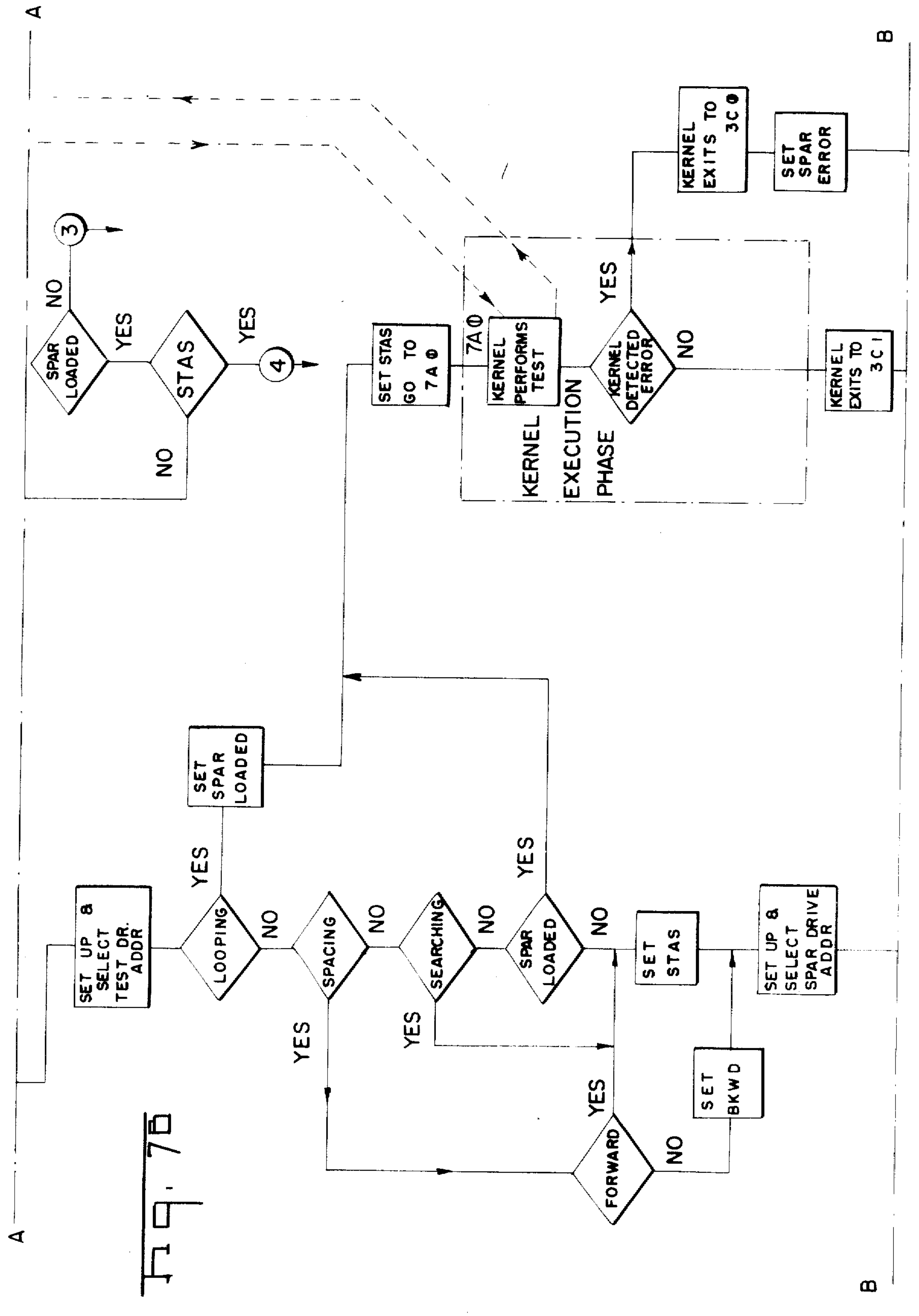
Figure 7C:
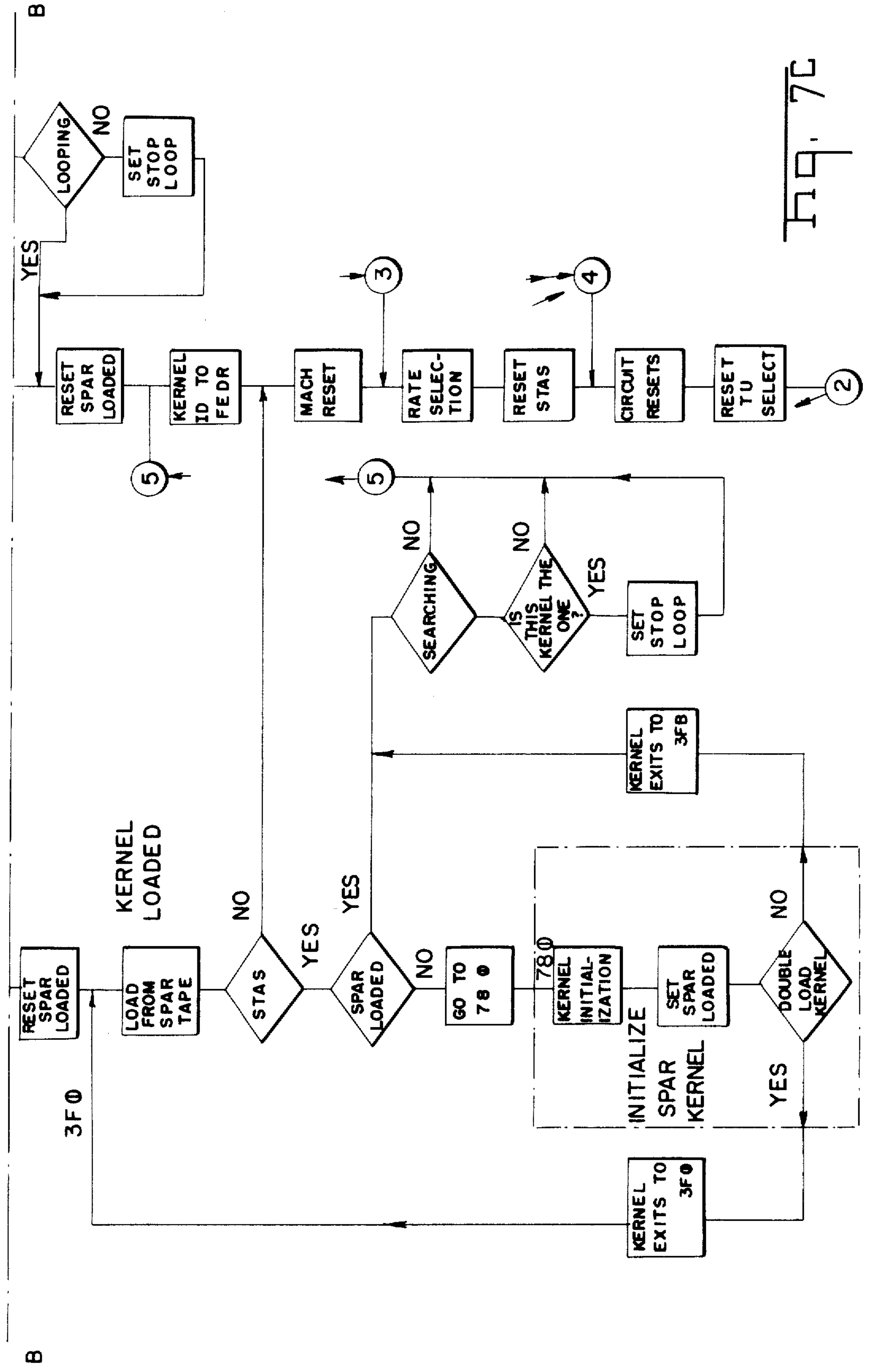

The FE BUFFER command sequences can be loaded and executed while the control unit remains available to and in use by the CPU or while the control unit is offline. The control unit can perform MAINTENANCE REQUESTS during the time that the CPU is not using the control unit. SPAR OPERATION—A complete flow sheet of the SPAR operation is shown in FIG. 7.

As was stated before, the FE BUFFER functions as a communications medium between SPAR and the FIELD ENGINEER. The FIELD ENGINEER will use the manual controls to load control information into the FE BUFFER, and will display information which is loaded into the FE BUFFER by the SPAR EXECUTIVE ROUTINE and the KERNELS. The definition of this information is as follows:

FE BUFFER POSITION 0 of Buffer 50 (FIG. 4)—Bits 0 through 7 are loaded by the FIELD ENGINEER with the address of the tape drive to be tested.

FE BUFFER POSITION 1 of Buffer 50 (FIG. 4)—Bits 0 through 7 are loaded by the FIELD ENGINEER, by use of rotary switches 83 and 84 with the address of the tape drive that contains the SPAR program tape. Bit C3, switch 81, is set to indicate to a special SPAR termination kernel that the SPAR program tape should be rewound and executed again in a continuing cycle.

FE BUFFER POSITION 2—All 12 bits are loaded by the KERNEL with its own identify number. This occurs during the INITIALIZATION PHASE of the KERNEL.

FE BUFFER POSITION 3—Bits 0 through 7 are loaded by the KERNEL with an error code when a failure is detected. This error code is cross referenced by the FIELD ENGINEER to SPAR documentation for a complete explanation of the failure and a list of logic cards which are thought to contain the failing component. Bits C1, C2 and C3 are loaded by the FIELD ENGINEER with the SPAR run options, as follows:

Bit C3 requests an unconditional loop of the SPAR KERNEL that is currently in the SPAR RAM. If C3 is off, bits C1 and C2 provide encoded space and search options follows:

| C1 | C2 | |
|---|---|---|
| 0 | 0 | Normal SPAR EXECUTION |
| 0 | 1 | Space the SPAR Program tape forward |
| 1 | 0 | Space the SPAR Program tape backward |
| 1 | 1 | Forward search for kernel specified in bits 0–7 (In this case, the FIELD ENGINEER will load bits 0–7 of FE BUFFER position 3 with the first 8 bits of the 12 bit KERNEL identity). |

The KERNEL identity is a 12-bit number, in which the leftmost 8 bits give the KERNEL number within a section and rightmost 4 bits give the section number. A section is a group of KERNELS which are designed to test a particular area of the control unit or tape drive. There are up to 256 KERNELS within a section and up to 16 sections on a SPAR program tape.

Note that a KERNEL search is only a forward search. The search argument permits a search for a particular KERNEL number within a section. The search will stop as soon as the first KERNEL with the specified number is encountered. If START is depressed, the search will continue to the next KERNEL with the specified KERNEL number. The section number is ignored. Search and space operations move the program tape, but do not execute the tests.

The FIELD ENGINEER will perform the following actions to indicate and control a SPAR run:

1. Enter the addresses of the drive to be tested and the drive which contains the SPAR program tape into FE BUFFER positions 0 and 1.
2. Enter the desired SPAR run options into FE BUFFER position 3.
3. Mount a scratch tape on the tape drive to be tested and the SPAR program tape on the selected drive.
4. Set the OFFLINE switch on both tape drives to the OFFLINE POSITION.
5. Set the SPAR ENABLE switch to the ON position.
6. Press START.

If the selected run option is a normal SPAR run, SPAR KERNELS will be loaded and executed automatically by the SPAR EXECUTIVE ROUTINE. If KERNEL detects an error, it will load an error code into bits 0 through 7 of FE BUFFER 50 position 3 and return to the error exit point in the SPAR EXECUTIVE ROUTINE, where the SPAR ERROR trigger 21 and the STOP LOOP trigger 17 will be set before returning to the IDLE LOOP. The STOP LOOP trigger 17 being on will stop the automatic execution of SPAR KERNELS. The FIELD ENGINEER can now use the KERNEL identity and the error code to cross reference to the SPAR documentation for a detailed explanation of the failure and the suspected failing component.

In the absence of any failure, the SPAR KERNELS will load and execute automatically until the termination kernel is reached. This kernel will look at bit C3 of FE BUFFER 50 position 1. If it is on, it will rewind the SPAR program tape and continue the SPAR run from the first KERNEL. If bit C3 of FE BUFFER 50 position 1 is off, the STOP LOOP trigger 17 is set and control is returned SPAR EXECUTIVE ROUTINE to the IDLE LOOP, indicating a successful completion of the SPAR run.

SPAR operations can be performed while the control unit is online or offline to the CPU. If the control unit is online to the CPU, It is said to be an "INLINE" SPAR operation. This means that the control unit may perform a SPAR operation during the time that the CPU is not using the control unit. If the CPU attempts to send a command to the control unit while it is loading or executing a SPAR KERNEL, a "busy" indication will be returned to the CPU. As soon as the OPERATIONAL MICROPROGRAM returns to the IDLE LOOP, it will give an indication to the CPU that it is no longer busy, then wait for the re-issuance of the command.

WTM SWITCH USAGE—The WTM switch provides a method of performing a common manual function is a convenient and easy manner. It is frequently required that new tapes be initialized with a "tape mark," prior to having useful data written on them. This "tape mark" is a special bit pattern which is written on the tape by a WTM command. The usual method of performing this operation in previous tape control units was to make the control unit offline to the CPU, then set up a WTM command in the manual controls and push START. This had two disadvantages: (1) The control unit and associated tape drives had to be taken OFFLINE or removed from CPU usage, and (2) The procedure of setting up and performing the WTM command was unduly complex.

The procedure to perform a WTM operation is as follows:

1. Set the address of the selected tape drive into the rightmost FE BUFFER rotary switch 84.
2. Set the WTM switch on.
3. Set the OFFLINE switch of the selected tape drive on the OFFLINE position.
4. Push START.

The control unit will write a tape mark in the selected tape drive, then will return to the IDLE LOOP with the STOP LOOP trigger 17 set. Note that this operation can be performed while the control unit is online or offline to the CPU. Both disadvantages of performing this operation on previous control units have been circumvented with this new design.

Other functional tasks can be performed with the FE BUFFER and the performance of these tasks can be multiplexed with the performance of CPU commands.

GLOSSARY

COMMAND—An 8 bit order code which asks the control unit and/or tape drive to perform a specific function. This code is normally received from the CPU via the channel, but will be obtained from the FE BUFFER if performing a MAINTENANCE REQUEST. Three examples of COMMANDS for magnetic tape are given below:

| ORDER CODE | MNEUMONIC | FUNCTION |
|---|---|---|
| 01 | WRT | Write the data which follows the order code on the selected tape drive |
| 02 | RD | Read the data from the selected tape drive |
| 27 | BKSP | Backspace the tape drive over a data record |

DBC—The Data Byte Counter, a 12-bit counter which is used as a byte counter for write commands from the FE BUFFER, and as a utility counter under SPAR operations.

DBR—The Data Byte Count Register, a 12-bit register which is loaded with a value of 0 to 4,095. It is used as to retain values to be loaded into the DBC.

EXECUTION PHASE—The portion of the SPAR "KERNEL" that performs the diagnostic test. A requirement of this phase is that it be self-starting such that it can be looped by itself-without requiring the rerun of the initialization phase. FE BUFFER—A Section of Control Unit logic that is used for various maintenance functions. It basically consists of a 16-position array, 12 bits wide, and necessary support logic. The 12 bits are numbered from 0 through 7, P, C1, C2, and C3. Commands and data can be loaded into the FE BUFFER and executed "INLINE" or "OFFLINE." SPAR uses the FE BUFFER as a communication medium between it and the operator, as well as a buffer for commands, data, and constants; and as a set of working registers.

FEDR—FE Buffer Data Register.

FE PANEL—The control unit panel which contains the switches and indicators used to manually operate the tape subsystem. It is located inside the control unit doors.

FIELD ENGINEER—The maintenance technician who is the usual operator of the Maintenance Facility.

GPC—The General Purpose Counter, a 16-bit counter and register that can be directly loaded by micro orders via an emit technique, and is in turn used for many functions in the control unit. It is not considered to be part of the maintenance facility.

IDLE LOOP—The OPERATIONAL MICROPROGRAM has a short sequence of micro orders, called the IDLE LOOP, which it continuously executes when it is not performing any CPU command or MAINTENANCE REQUEST. This micro order sequence merely interrogates the control unit logic for a CPU command or a MAINTENANCE REQUEST. When one of these is found, the OPERATIONAL MICROPROGRAM will leave the IDLE LOOP and go to another sequence of micro orders to perform the requested operation.

INITIALIZATION PHASE—The portion of the SPAR "KERNEL" that prepares the subsystem for the diagnostic test. One mandatory function of this phase is the setup of the "KERNEL" ID in the proper FE Buffer position. Other optional functions include setting up constants in the FE Buffer for use by the Execution Phase, and prewriting a test record on tape.

INLINE—A mode of operation in which SPAR and other maintenance functions are performed on a portion of the subsystem while the remainder of the subsystem remains in use by the CPU. The Control Unit is time shared between the CPU and SPAR or other maintenance functions.

IOR—Input Output Register. This register receives data from the CPU and sends data to the CPU.

KERNEL—An individual SPAR test routine, containing an Initialization Phase and Execution Phase. It is coded in the micro order language of the control unit. It is loaded into and executed out of the SPAR RAM.

LOADER—The logic which is used to load the SPAR RAM with data from a tape drive. MAINTENANCE MODE—A control trigger which is set by the OPERATIONAL MICROPROGRAM as it exits the IDLE LOOP on a MAINTENANCE REQUEST. The trigger is reset by the OPERATIONAL MICROPROGRAM as it returns to the IDLE LOOP at the completion of the MAINTENANCE REQUEST.

MAINTENANCE REQUEST—If the operational microprogram, while in the Idle Loop, finds the Stop Loop trigger off, it will leave the Idle Loop to perform a maintenance operation. This is considered to be a maintenance request, and the process must be manually initiated by pressing the START pushbutton.

MAF—Maintenance Facility — The entire collection of logic which is used to perform diagnostic testing at the tape subsystem level. The major sections are the SPAR RAM and the FE BUFFER.

MICRO BRANCH—A single order code which occupies one position in the ROM or SPAR RAM and senses for the presence or absence of a specific logic condition. The target address of the MICRO BRANCH specified two addresses in the ROM or SPAR RAM called a "branch pair." If the tested condition is not present, the next address to be performed is the even address of the "branch pair" (ROMAR bit 15 is off). If the tested condition is present, the next address to be performed is the odd address of the "branch pair"

(ROMAR bit 15 is on). MICRODIAGNOSTIC—A sequence of micro orders which is designed to perform a diagnostic test.

MICRO ORDER—A single order code which occupies one position in the ROM or SPAR RAM and causes a specific logic function to be performed. A number of micro orders are coded by a programmer into sequences that perform a particular job.

OFFLINE—A mode of operation in which the equipment referred to is logically removed and made unavailable to the CPU.

OFFLINE SWITCH—The switch on the tape unit which indicates whether the tape unit is to be considered online, and therefore available for use by the CPU Only; or offline, and therefore available for use by the FIELD ENGINEER via a MAINTENANCE REQUEST only.

ONLINE—A mode of operation in which the equipment referred to is available for use by the CPU.

OPERATIONAL MICROPROGRAM—The microprogram that is contained in the Control Unit ROM, and performs the commands obtained from the CPU or FE BUFFER. The SPAR Executive Routine is a part of the operational microprogram.

PB—Abbreviation for pushbutton ROM—Read Only Memory. The main control store for the control unit.

ROMAR—Read Only Memory Address Register. The register which specifies the specific location of the ROM or SPAR RAM which is to be accessed.

ROMDR—Read Only Memory Data Register—The register which receives the data output from the ROM and SPAR RAM which is then used to drive the micro order decode system.

SPAR—Acronym for Subsystem Program for Analysis and Repair. In general, it may refer to the portions of the control unit logic operational microprogram and program tape which comprise the SPAR system or to any part thereof.

SPAR EXECUTIVE ROUTINE—The portions of the operational microprogram that are involved in initiating and controlling the SPAR "Kernels."

SPAR RAM—The read/write Random Access Memory that is loaded with SPAR microcode. The output of the SPAR RAM is loaded into the ROMDR and feeds the micro order decode system of the Control Unit in the same manner as the ROM output.

START PB—The pushbutton that resets the STOP LOOP trigger to the OFF STATE and permits the OPERATIONAL MICROPROGRAM to leave the IDLE LOOP on a MAINTENANCE REQUEST. STOP LOOP TRIGGER—The trigger which controls the execution of MAINTENANCE REQUESTS. If the STOP LOOP TRIGGER is on, the OPERATIONAL MICROPROGRAM is not allowed to leave the IDLE LOOP on a MAINTENANCE REQUEST. If the STOP LOOP TRIGGER is off, the OPERATIONAL MICROPROGRAM is allowed to leave the IDLE LOOP on a MAINTENANCE REQUEST. The STOP LOOP TRIGGER is set by the STOP PB or by a micro order, and is reset by the START PB.

STOP PB—The pushbutton that sets the STOP LOOP trigger to the ON state.

TU—Abbreviation for tape unit.

WDR—Write Data Register. This register receives data from the LDR and loads it into the SPAR RAM.

While particular embodiments of the invention have been shown and described, other modifications will be apparent. The appended claims are, therefore, intended to cover all such modifications within the true spirit and scope of the invention.

What is claimed is:

1. In a magnetic tape data processing system including a central processor, a plurality of magnetic tape units and a control unit of the type having:

a first control memory having micro orders stored at addressable locations for controlling the operation of said magnetic tape units, an address register for addressing said locations, logic circuitry for interpreting said micro orders, for providing control signals to said magnetic tape units, for receiving responses from said magnetic tape units, and for setting said address register to address said memory, and a data bus connecting said logic circuitry to said magnetic tape units, said address register, said memory and said logic circuitry being interconnected to send control signals resulting from the decoding and interpretation of micro orders to tape units in response to commands from said central processor, an improved diagnostic facility comprising:

a second random access read/write memory connected in parallel with said first memory, a loader connected between said data bus and said second random access read/write memory for transferring diagnostic micro orders from a magnetic tape unit into said second memory, said loader including:

majority circuitry providing a highly redundant independent data path, not used for normal data transfer through said logic circuitry, between the magnetic tape units and said second memory whereby said loader is functionally independent of malfunctions in the tape units and/or control unit.

2. The system recited in claim 1 wherein said magnetic tape units each have read heads producing parallel outputs representing the information recorded on parallel data tracks of a magnetic tape, wherein said parallel outputs are applied to said data bus which connects said parallel outputs to said logic circuitry, and wherein said data path between said magnetic tape units and said second memory comprises:

amplitude sensors connected to said data bus, said amplitude sensors producing an output when the associated read heads are reading recorded data, the outputs of said amplitude sensors being connected to said majority circuitry, said majority circuitry producing an output when a majority of said amplitude sensors are producing an output, the output of said majority circuitry being connected to said second memory to transfer said diagnostic micro orders from said one of said magnetic tape units to said second memory.

3. The system recited in claim 2 wherein said amplitude sensors are further used to detect ones and zeros for reading data into said second memory directly rather than through the relatively complicated normal read detection circuits.

4. The system recited in claim 3 wherein said: amplitude sensors are further used for detecting the signals from the tape timing tracks so that the same tape can be read on any drive independent of speed or density.

5. The system recited in claim 1 wherein said control unit transfers microprogram control back and forth between said first memory and said second memory.

6. The system recited in claim 1 wherein said control unit includes a micro order branch and decode system activated from said second memory so that a subsystem including said control unit and at least one magnetic tape unit is operated for diagnostic and maintenance purposes.

* * * * *

PO-1050
(5/69)

UNITED STATES PATENT OFFICE
CERTIFICATE OF CORRECTION

Patent No. 3,798,614 Dated March 19, 1974

Inventor(s) James E. Meadows et al

It is certified that error appears in the above-identified patent and that said Letters Patent are hereby corrected as shown below:

Column 1, line 10, " (CUP) should read -- ( CPU);
line 41, "typing" should read --tying--;
line 43, "diagnostic" should read --diagnostics--.
Column 3, line 31, "Note that this" should read --This--;
delete lines 56-67 .
Column 4, delete lines 1-18;
line 26, "another" should read --an--;
delete lines 48-67.
Column 6, line 35, "located" should read --loaded--.
Column 12, line 1, "If control" should read --If the control--;
line 20,"micropgoram" should read --microprogram--.
Column 13, line 55, "brances" should read --branches--.

Signed and sealed this 12th day of November 1974.

(SEAL)
Attest:

McCOY M. GIBSON JR.
Attesting Officer

C. MARSHALL DANN
Commissioner of Patents